United States Patent [19]
Fosdick

[11] Patent Number: 6,053,700
[45] Date of Patent: Apr. 25, 2000

[54] DUCTED TURBINE

[75] Inventor: George A. Fosdick, Stony Brook, N.Y.

[73] Assignee: Fosdick High-Tek Wind Turbines, Inc.

[21] Appl. No.: 09/160,775

[22] Filed: Sep. 24, 1998

Related U.S. Application Data

[60] Provisional application No. 60/059,830, Sep. 24, 1997.

[51] Int. Cl.[7] .................................................... B63H 1/28
[52] U.S. Cl. .................. 416/93 A; 416/93 A; 416/93 R; 416/176; 416/175; 416/177; 416/178; 416/187; 416/189; 416/192; 416/193 R; 416/195; 416/198 R; 416/200 A; 416/200 R; 416/201 A; 416/201 R; 416/124; 416/130
[58] Field of Search ................................. 416/93 A, 93 R, 416/176, 193 R, 195, 198 R, 189, 200 A, 200 R, 201 A, 201 R, 124, 130, 175, 177, 178, 187, 192

[56] References Cited

U.S. PATENT DOCUMENTS

| | | |
|---|---|---|
| 949,150 | 2/1910 | Kestner . |
| 3,071,194 | 1/1963 | Geske . |
| 3,883,264 | 5/1975 | Rao . |
| 4,086,026 | 4/1978 | Tamanini . |
| 4,159,191 | 6/1979 | Graybill . |
| 4,427,343 | 1/1984 | Fosdick . |
| 4,778,419 | 10/1988 | Bolle et al. . |
| 5,800,123 | 9/1998 | Travor . |

OTHER PUBLICATIONS

Wind Machines Handbook, pp. 51–55, 60–61, 1976.
Yen, James T. "Tornado–Type Wind Energy System:Outline of Recent Developments", Dec. 3–5, 1980.

*Primary Examiner*—Edward K. Look
*Assistant Examiner*—Liam McDowell
*Attorney, Agent, or Firm*—Proskauer Rose LLP

[57] ABSTRACT

A turbine 400 has a central duct 410 which accelerates fluid passing through it and a blade configuration which retards the flow of fluid near the tips of the turbine. This structure results in a vortex having a higher fluid pressure behind the tips of the turbine blades 408 and a lower fluid pressure behind the duct. In the present invention, this vortex is enhanced by (1) an increased acceleration of the fluid passing through the duct 410 and a deceleration of the fluid passing through the blades 408; and/or (2) by a fluid redirection device 850 for directing the fluid passing through the duct towards the outer diameter of the turbine.

51 Claims, 8 Drawing Sheets

DUCTED TURBINE

RELATED PATENT AND APPLICATION

This patent application claims the benefit of U.S. provisional patent application Ser. No. 60/059,830 to George Fosdick filed on Sep. 24, 1997 and entitled "Improved Ducted Wind Turbine." This invention relates to improvements to ducted turbines such as the turbine described in U.S. Pat. No. 4,427,343 (the '343 patent) issued on Jan. 24, 1984 to George Fosdick, the inventor of the present invention. The contents of this provisional application and patent are incorporated herein by reference.

BACKGROUND OF THE INVENTION

1. Field of the Invention

The present invention relates to ducted turbines and, more particularly, to a ducted turbine which is both rugged and exceptionally efficient, resulting in high torque at low fluid (such as wind) speed and quiet operation. In a first preferred embodiment, increased efficiency is obtained by a structure which accelerates the fluid (such as wind) passing through the turbine duct and slows fluid passing through the outer diameter of the turbine. In a second preferred embodiment, increased efficiency is obtained by placing a fluid redirection device (a vortex enhancer) on a ducted turbine to direct fluid passing through the duct towards the outer diameter of the turbine.

2. Discussion of Related Art

Increases in energy costs, the finite supply of fossil fuels such as oil, natural gas, and coal, and pollution caused by burning fossil fuels have prompted the search for efficient and clean energy alternatives to fossil fuels. One alternative which has received widespread attention is the use of wind or air flow to generate energy. Legislation exists in many parts of the country requiring local utilities to accept and pay for inputs from such alternative energy sources, heightening the practicality and interest in implementing this source of renewable energy.

Another advantage of wind energy is that it may generate energy at locations not easily accessible to remotely generated energy, such as locations where no power line infrastructure exists. Such locations may be, for example, remote or underdeveloped areas, and ocean vessels. Thus, it may be advantageous to generate energy at a particular location where it is not feasible to supply the energy via a cable, wire, or other means. An efficient wind turbine may provide this advantageous arrangement. For example, applications such as water pumping and desalinization at remote areas and electrical power generation for ocean vessels, offshore rigs, and other locations to which it may be impossible or impractical to run power lines may benefit greatly from a highly efficient wind turbine. Moreover, wind energy does not create pollution and thus is clean.

Unfortunately, most wind turbine systems currently available have several principal drawbacks which make them impractical for most localities. The first and most important of these drawbacks is that the typical wind turbine does not operate efficiently unless there is a relatively high wind velocity, often as high as twenty knots. Many areas of the world do not have sustained wind velocities of more than six to ten knots, causing most common wind turbines to be unsuitable for use as a reliable energy source.

The second principal drawback is the high noise level produced by most commonly available wind turbines. The blade arrangement of these turbines is usually designed to obtain maximum revolution rate, resulting in a disturbing, audible noise level which varies in intensity and pitch with variations in wind velocity.

The third drawback of some currently available wind turbines is the inability to withstand high velocity winds greater than forty knots. Unfortunately, velocities well in excess of forty knots occasionally occur in many parts of the world.

The fourth drawback is that turbine systems currently available have a limited efficiency. One believed limitation on turbine efficiency is a physical principal called the Betz Limit. The Betz Limit states that the maximum efficiency of the very best wind turbine (or other fluid turbine) is 59.3%.

U.S. Pat. No. 4,427,343 (the '343 patent) describes a highly efficient wind turbine for airflow velocities as low as three knots and which maintains its efficiency and structural integrity at higher airflow velocities. The wind turbine described in the '343 patent is illustrated in FIGS. 1, 2, 3A, and 3B. Low speed tests performed in 1991 on the '343 patent wind turbine suggest that its efficiency approaches the Betz Limit.

Figure 1:
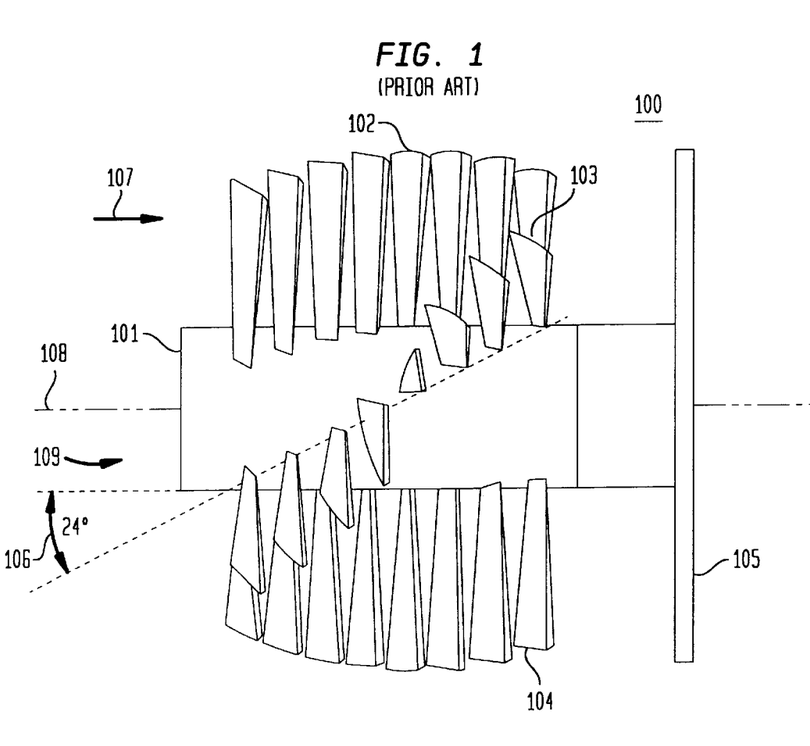
FIG. 1 is a side elevational view of a turbine described in U.S. Pat. No. 4,423,343.

FIG. 1 shows a blade arrangement of a preferred embodiment of the ducted wind turbine 100 described in the '343 patent. The wind turbine 100 comprises a hollow cylindrical blade support mechanism 101, several helical rows of blades, such as the first, second, and third helical rows of blades 102, 103, and 104 seen in FIG. 1, and a power takeoff mechanism, such as a pulley 105. The hollow cylindrical blade support mechanism 101 includes the duct 250 (see FIG. 2) through which wind (or other fluid) may pass unimpeded by turbine blades.

The blades are attached at one end to the blade support mechanism 101 and extend radially outward therefrom, as well as extend in rows along the surface of the blade support mechanism such as rows 102, 103, 104. These rows spiral back in a rotational direction from the front 109 of the turbine, forming an angle with the axis of rotation 108. For a six row device, for example, this angle with the axis of rotation 106 is 24°±5°. The nominal diameter of the cylindrical support mechanism remains one-third of the wind turbine diameter as measured from diametrically opposed blade tip to blade tip. A practical embodiment may include twenty blades in a row. Only three rows are shown in FIG. 1 for clarity. However, the general spiral configuration of the rows is evident.

Figure 2:
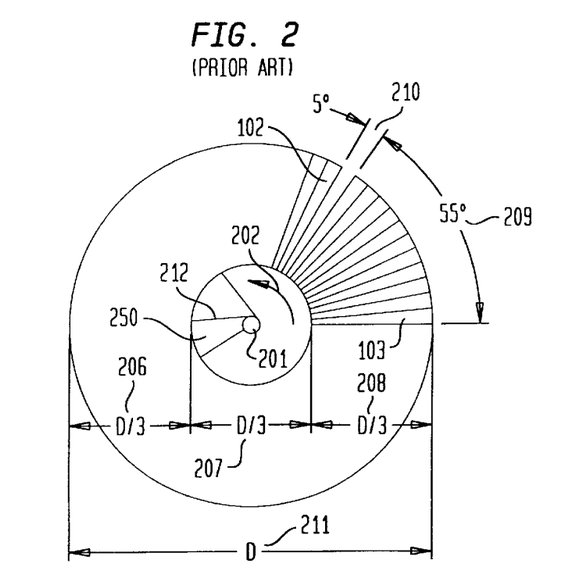
FIG. 2 is a front elevational view of a turbine described in U.S. Pat. No. 4,423,343.

FIG. 2 is a front elevational view of the '343 patent wind turbine 100, showing a first row of blades 103 and a portion of a second row of blades 102. The remaining rows are similar and are not shown. The cylindrical support defines the duct 250. Both the interior and exterior surfaces of the duct are cylindrical. The exterior surface is the blade support surface, the interior surface is the central duct. The cylindrical support 101 may be supported by spokes 212 which extend radially from a hub 201. The spokes 212 are designed to have a relatively small frontal cross section to reduce drag and provide for an essentially unresisted flow through the duct. Between rows, there is preferably a nominal spacing 210 of 5°.

FIG. 2 shows the relative dimensions of the blades and the cylindrical support mechanism 101. This arrangement provides a relatively large circumferential area about the cylindrical support mechanism on which to mount the blades and eliminates masking, eddy currents, and weakened structures encountered in other prior art devices which use the hub for mounting the blades.

Figure 3A:
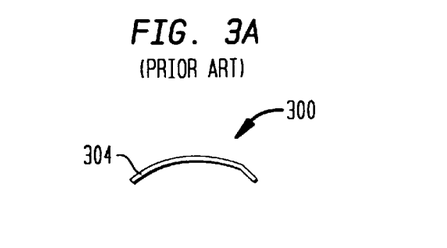
FIG. 3A is a plan view of a turbine blade described in U.S. Pat. No. 4,423,343.
Figure 3B:
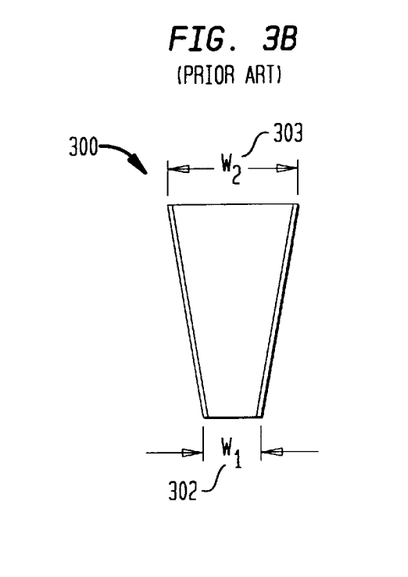
FIG. 3B is a front elevational view of the turbine blade of FIG. 3A.

The blade arrangement described above provides high efficiency at low velocity. FIG. 3A shows a plan or edge view of a blade 300. FIG. 3B shows a front elevational view of the blade 300. The rear face 304 of the blade 300 has a curved, convex, or airfoil shaped contour which provides a "pulling" or lifting effect from the rear of the blade in addition to the normal direct pressure or "push" effect on the frontal area or forward concave face of the blade, thereby increasing the effective force delivered to the blade 300 by a passing fluid flow. FIG. 3B shows a front view of a blade 300. The blade 300 tapers from a wide width W2 303 at the tip to a narrower width W1 302 at the base.

Although the wind turbine described in the '343 patent is efficient, quiet, and rugged, improvements in efficiency remain desirable. Efficiency improvements make turbines more desirable because more usable energy per unit of fluid (such as wind) energy may be generated than previously possible.

It is an object of the present invention to improve upon the efficiency of the turbine described in the '343 patent and other ducted turbines.

It is yet a further object of the present invention to provide a wind turbine which has an efficiency exceeding those previously thought possible according to the Betz Limit.

It is even a further object of the present invention to provide a clean and efficient energy source.

SUMMARY OF THE INVENTION

These and other objects are provided by a turbine having a duct which accelerates fluid passing through it and a blade configuration which retards the flow of fluid and directs the fluid towards the tips of the turbine blades. This structure results in a vortex having a higher fluid pressure behind the tips of the turbine blades and a lower fluid pressure behind the duct. In the present invention, this vortex is enhanced by (1) increasing acceleration of the fluid passing through the duct and a deceleration of the fluid passing through the blades and directing the fluid towards the tips of the blades; and/or (2) by redirecting the fluid passing through the duct towards the outer diameter of the turbine.

In a first preferred embodiment, efficiency is increased by providing a blade support mechanism in which (1) the duct accelerates the fluid passing through it by an amount greater than acceleration experienced by the same fluid flowing through a cylindrical duct; and (2) the blade support external surface decelerates the fluid flow and directs the fluid towards the blade tips. Such a blade support mechanism may be realized by providing an internal surface (duct) which has a non-cylindrical geometry such as a half-venturi or truncated cone, and an external surface (blade support surface) having a greater diameter at the rear of the turbine then at the front of the turbine. In a preferred embodiment, tip foils are connected to the blade tips of each row; and the blades have a constant chord.

In a second preferred embodiment, efficiency is increased by a ducted turbine having a fluid redirection device (vortex enhancer) configured to redirect fluid passing through the duct towards the outer diameter of the turbine. In a preferred embodiment, this is achieved by providing a fluid redirection device behind the duct at a distance which varies with the design of the turbine and blower. Such a fluid redirection device may be realized by providing a "squirrel-cage" blower behind the duct at a distance which varies with the design of the turbine and blower. The squirrel-cage blower may be mounted on the same shaft as the turbine and may also rotate at the same speed as the turbine. Alternatively, the fluid redirection device (such as a squirrel-cage blower) may be configured to rotate faster or slower than the turbine.

Tests have shown that the addition of the fluid redirection device to the turbine described in the '343 patent unexpectedly provides about a 100% efficiency (i.e., double) increase over the turbine described in the '343 patent. Recent test data suggests that this second embodiment has an efficiency which exceeds the Betz Limit.

Both of these preferred embodiments are rugged, quiet, relatively inexpensive to manufacture, and exceptionally efficient. Of course, it is contemplated that the first and second embodiments may be combined to provide a particularly efficient turbine.

BRIEF DESCRIPTION OF THE DRAWINGS

The present invention is described with reference to the following Figures.

DETAILED DESCRIPTION OF PREFERRED EMBODIMENTS

Figure 4A:
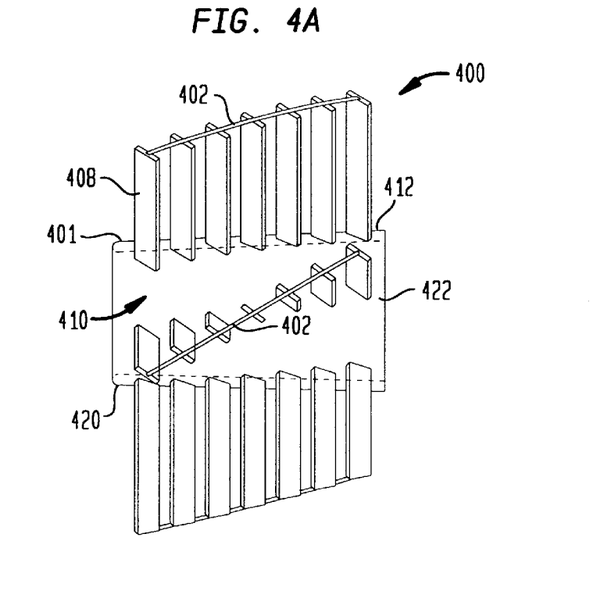
FIG. 4A is a side elevational view of a first preferred embodiment of a turbine according to the present invention.
Figure 4B:
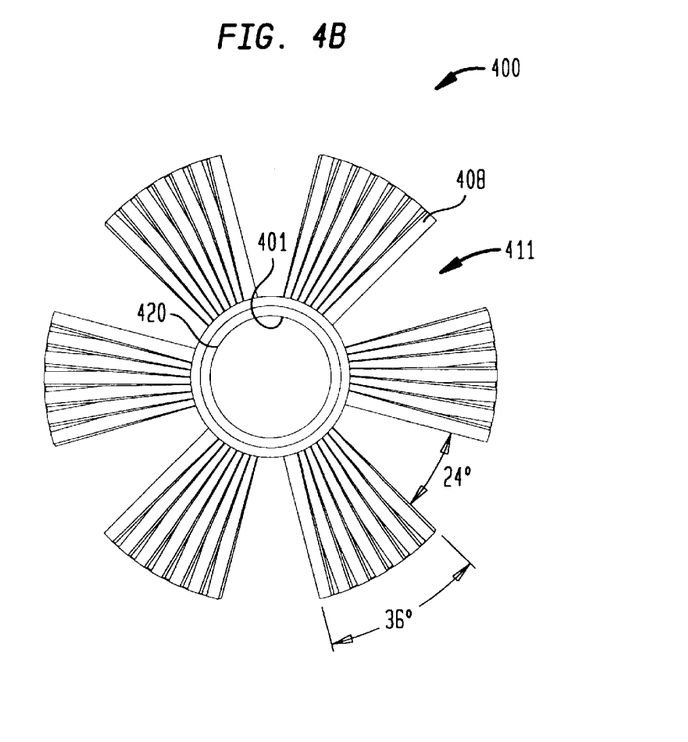
FIG. 4B is a partial front elevational view of the turbine of FIG. 4A.
Figure 5:
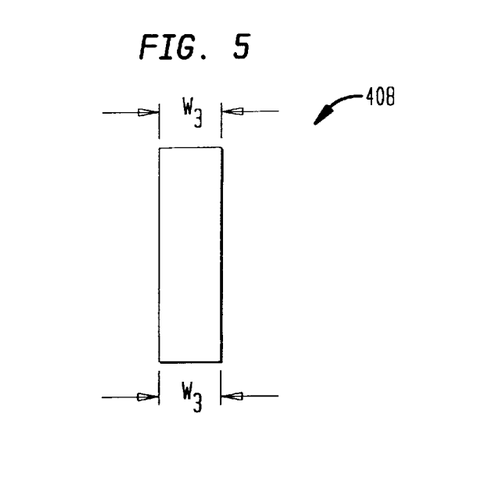
FIG. 5 is a front elevational view of a preferred embodiment of a turbine blade according to the present invention.

FIG. 4A is a side elevational view of a first preferred embodiment of a turbine 400 according to the present invention. FIG. 4B is a partial front elevational view of the turbine 400 of FIG. 4A. The turbine 400 of FIGS. 4A and 4B includes improvements over the turbine 100 illustrated in FIG. 1 and described in the '343 patent. The turbine 400 has a hollow blade support mechanism 401 on which a number of blades 408 are mounted. A modification of the inventive turbine over the turbine described in '343 patent is that the blade tips are connected by tip foils 402. These tip foils 402 connect the blade tips of each blade in a row. Empirical wind tunnel testing reveals that these tip foils improve the structural integrity of the turbine and improve its aerodynamic efficiency. A second modification of the inventive turbine 400 over the turbine 100 described in the '343 patent is that the blades 408 of the turbine of FIGS. 4A and 4B have a constant chord, or width. FIG. 5 is a front elevational view of a preferred turbine blade 408 according to the present invention. Note that the blade has a constant width W3 over the entire length of the blade. Empirical wind tunnel testing has revealed that using the constant chord blade 408 results in an efficiency increase over the turbine described in '343 patent 100. A constant chord blade is also easier to manufacture than the tapered chord blades.

It should be apparent that in a preferred embodiment, the blade has the shape seen in FIG. 3A.

As seen in FIGS. 4A and 4B, the blades 408 are mounted on the external surface of the blade support mechanism 401 in a number of helically arranged rows. The blades 408 preferably are arranged in six rows of seven blades, the rows being helically arranged on the blade support mechanism 401. Preferably, a spacing 411 of about 24° is provided between the helical rows. If there are six helical rows, each row 414 preferably extends over about 36° of the circumference of the turbine from the trailing edge of the forward blade to the leading edge of the rearward blade.

The blade support mechanism 401 has an external surface 412 configured to decelerate fluid passing through the blades and direct the flow towards the tips of the blades. In one preferred embodiment, this is provided by an external surface 412 which has a greater diameter at the rear of the turbine than at the front of the turbine. In this preferred embodiment, the diameter changes linearly from front to back. The tips of the blades 408 define a constant diameter for the turbine. That is, the blades 408 decrease in length in proportion to an increase in width of the support mechanism's external surface 412.

In the turbine 100 of FIG. 1 and described in the '343 patent, the duct (i.e., the internal surface of the blade support mechanism) is cylindrical. In contrast, in the preferred embodiment the duct is a central duct and is configured to accelerate the fluid passing through it by an amount greater than acceleration experienced by the same fluid flowing through the cylindrical duct under similar conditions such as pressure, fluid speed, and duct size. This may be achieved by providing the duct with a non-cylindrical geometry configured to accelerate fluid passing through it.

Figure 10A:
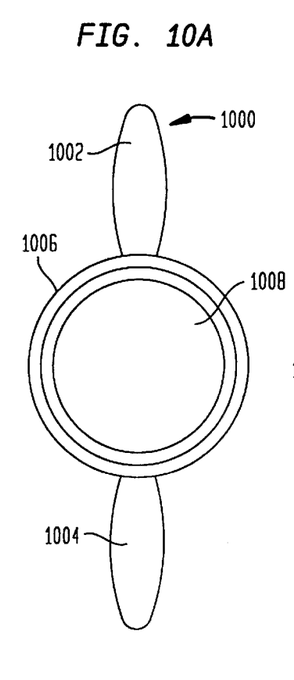
FIGS. 10A, 10B, and 10C are side views of alternative embodiments according to the present invention.
Figure 10B:
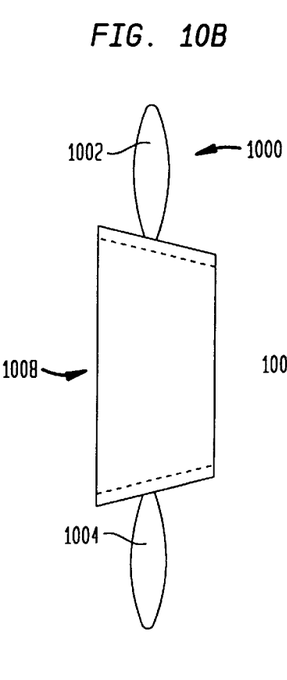

A preferred embodiment of the present invention realizes this acceleration by providing an internal surface 410 which defines the duct and which is shaped as a truncated cone or a half-venturi. The truncated cone or venturi may diverge, as seen in FIG. 4A and, or converge, as seen in FIGS. 6C and 10B. FIG. 4A shows a divergent truncated cone. FIG. 10B shows a convergent truncated cone.

Studies have shown that improved acceleration is achieved when the non-cylindrical geometry is either convergent or divergent. If the duct configured as a truncated cone converges (narrows) from front to rear (FIG. 10B), the duct acts as a venturi. If the duct configured as a truncated cone diverges (widens) from front to rear (FIG. 4A), the duct provides less surface friction than a cylinder having the same front face diameter.

A duct configured as a venturi preferably has an opening which is wider at the front and narrower at the back. The external surface may diverge (FIG. 6C) or converge (FIG. 6A) with respect to the duct surface.

Empirical studies have found that the duct diameter should be approximately 44% of the entire turbine diameter. The blades, therefore, being the remaining 56% of the turbine 400 diameter.

Figure 6A:
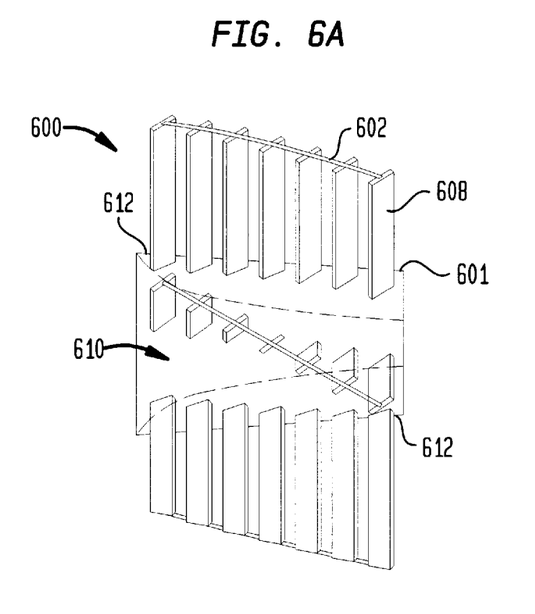
FIG. 6A is a side cross-sectional view of a second embodiment of a preferred turbine according to the present invention.
Figure 6B:
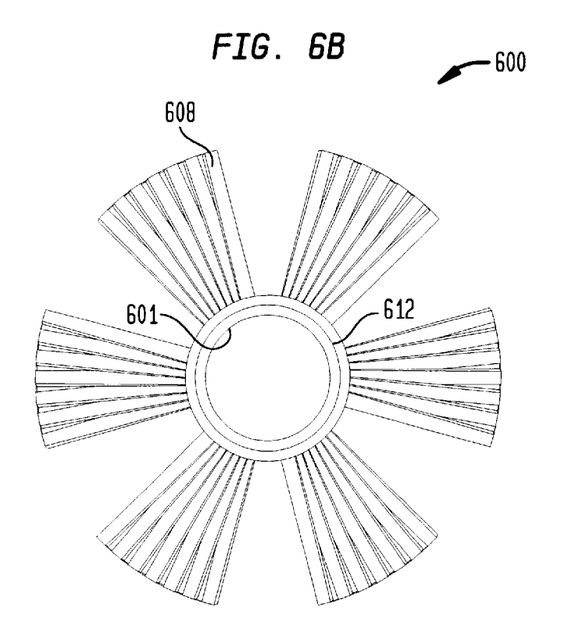
FIG. 6B is a partial front elevational view of the turbine of FIG. 6A.
Figure 6C:
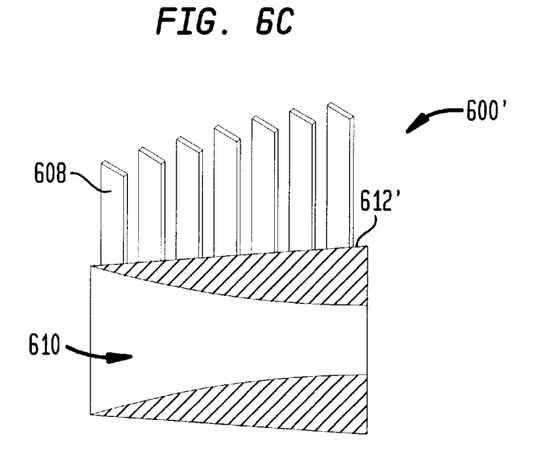
FIG. 6C is a partial side cross-sectional view of an alternative embodiment of the turbine of FIG. 6A.

FIG. 6A is a side elevational view of an alternate embodiment 600 of the turbine according to the present invention. FIG. 6B is a front elevational view of the turbine 600 of FIG. 6A. FIG. 6C is a partial side cross sectional view of an alternate embodiment 600' of the turbine of FIG. 6A.

As in FIG. 6A, a number of helically arranged rows of blades are mounted on an external surface 612 of the blade support mechanism 601. The tips of the blades 608 define a constant diameter for the turbine. That is, the blades 608 decrease in length in proportion to an increase in width of the support mechanism's external surface 612. Preferably, the blades 609 may have a constant chord, as seen in FIG. 5 and may have tip foils 602 (see FIG. 6A).

The duct is a central duct which is not cylindrical, but rather has a non-cylindrical geometry configured to accelerate the fluid passing through it an amount greater than acceleration which may be experienced by the same fluid flowing through a cylindrical duct under similar conditions. FIG. 6A shows a convergent structure. That is, the external surface and the duct diverge from front to back. FIG. 6C shows a converge structure. That is, the external surface diverges from front to back and the duct converges from front to back.

The first preferred embodiment illustrated in FIGS. 4A, 6A, and 6C has several improvements which substantially increase the efficiency of the turbine according to the present invention. A first improvement is the configuration of the duct 410, 610. The non-cylindrical geometry of the duct 610, such as the half-venturi or truncated cone, accelerates the fluid passing through it. This acceleration is greater than acceleration which may be experienced by the same fluid flowing through a cylindrical duct under similar conditions. Thus, under similar conditions, the fluid exiting the duct 410, 610 is at a lower pressure than the fluid exiting the duct 250 of the turbine 100 of the '343 patent.

As seen in FIGS. 4A and 6C, a second improvement is the external surface 412, 612' of the blade support mechanism 401, 601. In this preferred embodiment, the external surface 412, 612' is a truncated conical section which increases in size from front to back. This configuration decelerates the fluid flow and directs the flow towards the outer diameter of the turbine. Thus, under similar conditions, the fluid exiting the blade tips 408, 608 is at a higher pressure than the fluid exiting the blade tips 102 of the turbine 100 of the '343 patent.

Preferably, the dimensions of the turbine, including the truncated cone or half-venturi-shaped opening 610 are determined empirically by studying the efficiency of the turbine at the median fluid speed of the location in which the turbine is to be located. Note that using the average fluid speed to determine dimensions is probably not preferable. For example, if the turbine is to be used as a wind turbine, strong winds, such as hurricanes, tornados, or other storms, could raise the average wind speed of a particular location to a speed that is not as common to the location as the median wind speed.

As described in detail below, the high efficiency of the turbine is believed to be due to a vortex which is created behind the turbine. Thus, it is preferable that the area behind the turbine be free of impediments, except as discussed below in relation to a second preferred embodiment. Thus, it may not be preferred to connect a rudder or other steering device directly behind the turbine in the area of the vortex. Rather, a vertically displaced rudder, drogue, or other mechanism which points the front of the turbine directly into the fluid flow may be used.

Figure 7:
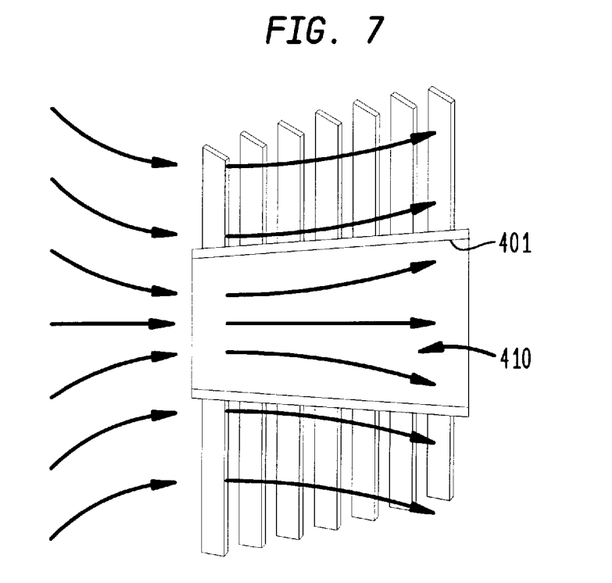
FIG. 7 illustrates fluid movement through the turbine of FIG. 4A.

FIG. 7 illustrates what the inventor believes is the fluid movement through a turbine 400 as seen in FIG. 4A. (A similar fluid movement occurs in the turbines of FIGS. 6A, 6B, and 6C.) As seen in FIG. 7, fluid passing through the duct 410 is accelerated an amount greater than acceleration experienced by fluid flowing through the cylindrical duct 250 seen in FIG. 2. This increased acceleration is due to the non-cylindrical geometry configured to accelerate the fluid. For example, in the embodiment seen in FIG. 4A, the truncated cone or venturi effect created by the shape of the duct accelerates the fluid. The fluid exiting the opening of the turbine of FIG. 4A is at a lower pressure than when it entered the rotor and is at a lower pressure than fluid exiting the opening of the turbine 100 in FIG. 1. Fluid entering the blades of the turbine of FIG. 4A is slowed down by the blades and pushed towards the blade tips by the external surface 412 of the blades support 401. This causes the fluid exiting the blades at the tips to have a higher pressure than the fluid exiting the blades of the turbine 100 of FIG. 1. This creates in the turbine 400 of FIG. 4A an even greater pressure gradient from the blade tips to the central duct than in the turbine 100 of FIG. 1. This greater pressure gradient creates an even higher torque rotor rotation and thus an even more efficient turbine rotation than the turbine seen in FIG. 1.

Figure 8A:
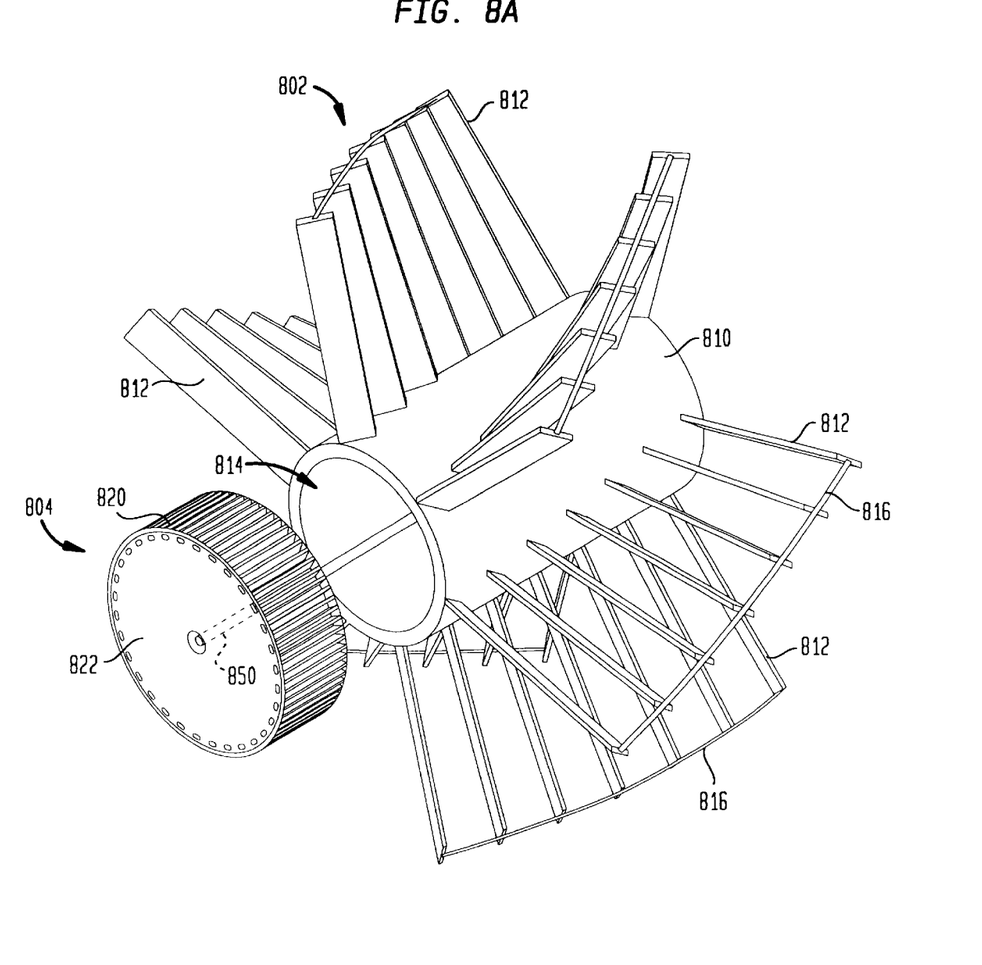
FIG. 8A is an isometric view from the rear of a turbine of a second embodiment according to the present invention.

FIG. 8A is an isometric view from the rear of a second embodiment of an improved ducted turbine 800 according to the second preferred embodiment of the present invention. In this second preferred embodiment, efficiency is increased over the present turbine by a fluid redirection device (vortex enhancer) configured to redirect fluid passing through the duct towards the outer diameter of the turbine. As seen in FIG. 8A, the improved ducted turbine 800 includes a ducted turbine 802 and a fluid redirection device 804. In the illustrated embodiment, the ducted turbine 802 includes a blade support mechanism 810 which supports a number of blades 812 and which has a duct 814. The fluid redirection device 804 may be a squirrel-cage blower which comprises a number of blades 820 each connected to a vertical base 822. The ducted turbine 802 and the fluid redirection device 804 may be mounted on the same shaft 850. The ducted wind turbine 802 may include tip foils 816 and have constant chord blades 812. In the simplest embodiment of this invention, the squirrel-cage blower 104 rotates synchronously with the ducted turbine.

Figure 8B:
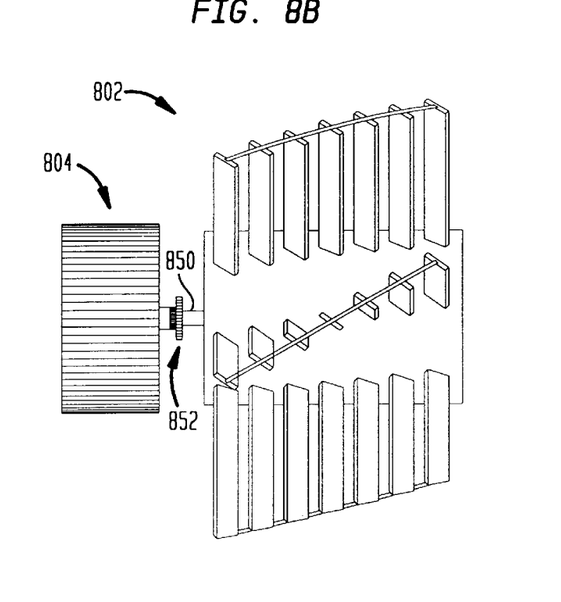
FIG. 8B is a side elevational view of an alternative embodiment of the turbine of FIG. 8A.

In an alternative embodiment, the fluid redirection device 804 may be configured to rotate at a speed different from the ducted turbine. As seen in FIG. 8B, the fluid redirection device may be mounted on the shaft 850 using bearings and connected to a mechanism 852, such as pulleys, gears, or other devices well known to those skilled in the art, which increase or reduce the speed at which the fluid redirection device 804 rotates with respect to the ducted turbine 802. (Note that the size of the gap between the turbine 802 and the fluid redirection device 804 may be empirically derived after selection of the turbine type and fluid redirection device. See Table 1, below.)

The fluid redirection device 804, such as the squirrel-cage blower seen in FIG. 8A, preferably has an inlet diameter approximately the same as the interior diameter of the duct 814 and is mounted at the back (aft) of the ducted turbine 802. For a one meter turbine, a currently preferred embodiment of a squirrel cage blower has an inlet diameter of 17⅛", an outside diameter of 22", and a width of 11¼". The distance between the turbine 802 and the fluid redirection device 804 may vary according to the particular application. A preferred distance is approximately 16.5" for a one meter turbine.

Figure 9A:
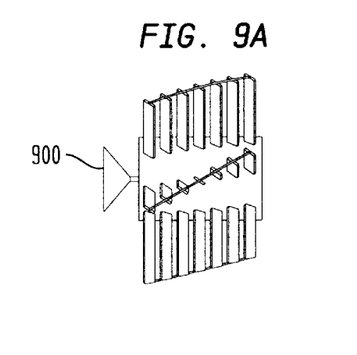
FIGS. 9A and 9B illustrate alternative embodiments of the fluid redirection device of FIG. 8A.
Figure 9B:
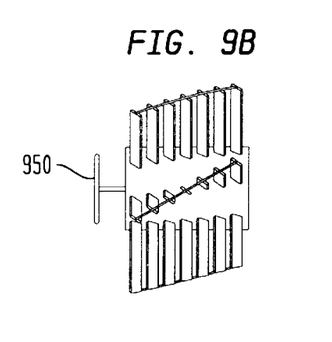

The fluid redirection device may have any configuration which redirects the duct exhaust so that it is orthogonal to the direction of the fluid flow and thereby enhances the swirling effect created by the blades 802. For example, FIG. 9A shows a cone 900 as a fluid redirection device. FIG. 9B shows a plate 950 as a fluid redirection device.

Wind tunnel tests indicate that the turbine 800 of FIG. 8 unexpectedly doubles the efficiency of the turbine 100 of FIG. 1. The following data were obtained in a wind tunnel test performed with the turbine of FIG. 800 located at the front of the wind tunnel test chamber. This location provides the least obstruction to the swirl created at the vortex of the turbine and therefore is expected to yield results similar to those which would be obtained in actual use as a wind turbine. The variables are defined as follows:

WIND TUNNEL VDC: The DC voltage applied to the wind tunnel motor to achieve a constant speed, GAP indicates the distance between the turbine and the fluid redirection device;

MV Load: A voltage applied to a brake resisting the rotation of the turbine. The force of this brake is a load which the turbine must overcome to turn;

AV.RPM: The average revolutions per minute of the turbine;

FACTOR: A scaling factor taking into consideration the swept area of the turbine;

POWER: The load×RPM×FACTOR;

TURBINE DIAMETER: The entire diameter of the turbine;

DEVICE: Indicates the presence or absence of the fluid redirection device (here, "aft" indicates that the device is mounted behind the turbine and "SC" indicates that a squirrel cage blower rotating synchronously with the turbine was used);

COMPARISON: Compares the best power coefficient of the turbine of FIG. 1 (modified with tip foils and constant chord blades) with the best power coefficient of the turbine of FIG. 8A.

TABLE 1

| WIND TUNNEL VDC | MV load | AV. RPM | FACTOR | POWER | TURBINE DIAMETER | DEVICE | Comparison |
|---|---|---|---|---|---|---|---|
| 29.1V | 90 | 222.6 | 0.7399699 | 14824.56 | 13.950" | NO SC | |
| 29.1V | 100 | 200.0 | 0.7399699 | 14798.40 | 13.950" | NO SC | |
| 29.1V | 110 | 186.8 | 0.7399699 | 15204.90 | 13.950" | NO SC | 100.00 |
| 29.1V | 120 | 166.0 | 0.7399699 | 14740.20 | 13.950" | NO SC | |
| 29.1V | 130 | STOPS | 0.7399699 | #VALUE! | 13.950" | NO SC | |
| 29.1V 2.000" GAP | 190 | 200.2 | 0.7399699 | 28146.98 | 13.950" | AFT SC | |
| 29.1V 2.250" GAP | 190 | 204.5 | 0.7399699 | 28751.53 | 13.950" | AFT SC | |
| 29.1V 2.500" GAP | 190 | 205.4 | 0.7399699 | 28878.07 | 13.950" | AFT SC | |

TABLE 1-continued

| WIND TUNNEL VDC | MV load | AV. RPM | FACTOR | POWER | TURBINE DIAMETER | DEVICE | Comparison |
|---|---|---|---|---|---|---|---|
| 29.1V 2.750" GAP | 190 | 208.8 | 0.7399699 | 29356.09 | 13.950" | AFT SC | |
| 29.1V 3.000" GAP | 190 | 208.6 | 0.7399699 | 29327.97 | 13.950" | AFT SC | |
| 29.1V 3.250" GAP | 190 | 209.5 | 0.7399699 | 29454.50 | 13.950" | AFT SC | |
| 29.1V 3.500" GAP | 190 | 205.4 | 0.7399699 | 28878.07 | 13.950" | AFT SC | |
| 29.1V 3.750" GAP | 190 | 205.6 | 0.7399699 | 28906.18 | 13.950" | AFT SC | |
| 29.1V 4.000" GAP | 190 | 209.0 | 0.7399699 | 29384.20 | 13.950" | AFT SC | |
| 29.1V 4.250" GAP | 190 | 209.6 | 0.7399699 | 29468.56 | 13.950" | AFT SC | |
| 29.1V 4.500" GAP | 190 | 209.0 | 0.7399699 | 29384.20 | 13.950" | AFT SC | |
| 29.1V 4.750" GAP | 190 | 211.4 | 0.7399699 | 29721.63 | 13.950" | AFT SC | |
| 29.1V 5.000" GAP | 190 | 213.0 | 0.7399699 | 29946.58 | 13.950" | AFT SC | |
| 29.1V 5.250" GAP | 190 | 210.8 | 0.7399699 | 29637.27 | 13.950" | AFT SC | |
| 29.1V 5.500" GAP | 190 | 218.6 | 0.7399699 | 30733.91 | 13.950" | AFT SC | 202.13 |
| 29.1V 5.750" GAP | 190 | 211.6 | 0.7399699 | 29749.75 | 13.950" | AFT SC | |
| 29.1V 6.000" GAP | 190 | 216.3 | 0.7399699 | 30410.54 | 13.950" | AFT SC | |

*A single inlet squirrel-cage blower is positioned aft of the turbine the GAP distance shown above.

The first five rows of this table are results obtained from a turbine without a fluid redirection device. The highest power coefficient is achieved when the load is 110 mV. This is selected as representing "100%", or maximum efficiency for this turbine. The remaining seventeen rows are results obtained from a turbine using a fluid redirection device. The highest power coefficient is achieved at a 190 mV load and a 5.5 inch gap. The resultant power is more than twice the power of the maximum efficiency of the turbine without the fluid redirection device.

In addition, recent tests performed on the turbine 800 of FIG. 8 outside of a wind tunnel on a 55 foot high tower have yielded data which suggests that this improved turbine exceeds the Betz Limit (i.e., that the maximum energy efficiency of the turbine is 59.3% of the energy in the swept area). That is, it is believed that the inventive wind turbine has achieved an efficiency that was previously considered to be physically impossible to achieve. One possible reason for this unexpected result may be that the turbine pulls in a column of fluid (air) greater than its diameter. The foregoing is illustrated in FIG. 7. Another possible reason for this unexpected result may be that the duct in the turbine does not follow standard actuator disc theory. In standard actuator disc theory, fluid stagnates up in front of the disc, thus inhibiting the fluid flow through the disc. The duct in the turbine according to the present invention greatly minimizes this stagnation.

Also, testing has shown that the turbine 800 according to the second embodiment of the present invention begins to turn at a fluid speed as low as about 2.5 knots, a significant advance over prior art turbines. Another important property of the inventive turbine is that the turbine rotation speed reaches a maximum speed which will not be exceeded even in high fluid speeds. For example, the inventive turbine being used as a wind turbine may be subjected to hurricane force winds yet will not rotate at an excessive speed.

Alternative Structures of the Inventive Wind Turbine

The preferred embodiment of the present invention is the '343 patent turbine 100 modified as described herein. Nevertheless, conventional turbines may be improved by modifying them in accordance with the present invention. For example, single blade, two blade, and multi-blade turbines may be modified according to the present invention. FIGS. 10A and 10B illustrate a conventional single propeller wind turbine modified in accordance with the first embodiment of the present invention. The propeller turbine 1000 has two blades 1002, 1004 connected to a blade support mechanism 1006. The blade support mechanism defines a central duct 1008 configured to accelerate the wind passing through it an amount greater than acceleration which may be experienced by wind flowing through a cylindrical duct under similar conditions. As seen in FIG. 10B, the central duct has a converging truncated cone.

Figure 10C:
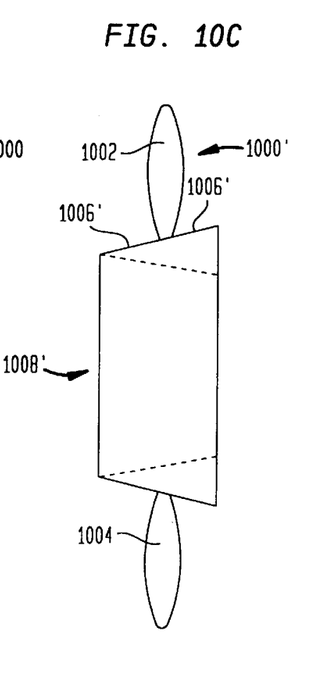

FIG. 10C is an alternative embodiment of a conventional single propeller wind turbine modified according to the present invention. The wind turbine 1000' has two blades 1002, 1004 mounted on a blade support mechanism 1006'. Unlike the blade support mechanism in FIGS. 10A and 10B, this blade support mechanism 1006' has an external surface having a greater diameter in the back of the turbine than in the front. The central duct 1008' is configured to accelerate the wind flowing through it an amount greater than any acceleration which may be experienced by wind flowing through a cylindrical duct, such as the truncated cone or half-venturi configuration described above.

Figure 11A:
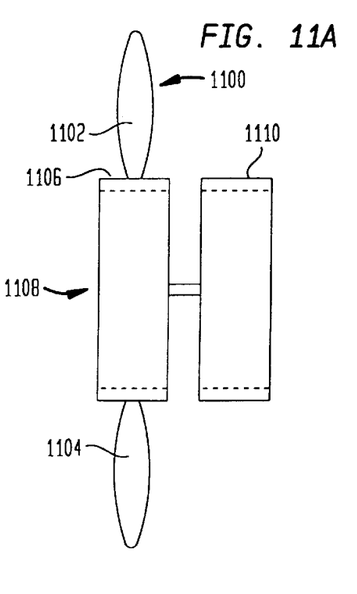
FIGS. 11A and 11B are side views of alternative embodiments according to the present invention.
Figure 11B:
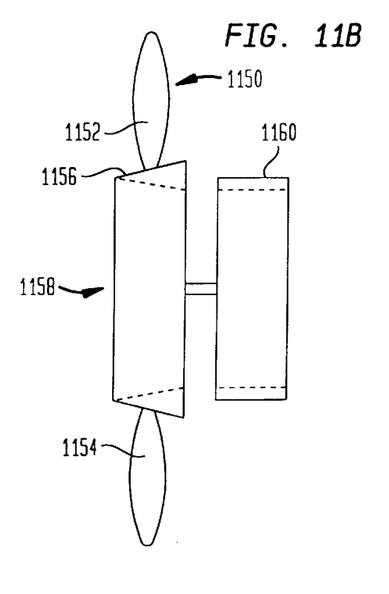

FIGS. 11A and 11B illustrate a conventional single propeller wind turbine modified in accordance with the second embodiment of the present invention. The single propeller turbine 1100 of FIG. 11A has two blades 1102, 1104 connected to a blade support mechanism 1106. The blade support mechanism 1106 defines a central duct 1108. A fluid redirection device 1110 is connected to the blade support mechanism in axial alignment with the duct. FIG. 11B is similar to FIG. 11A, except that the blade support mechanism has a duct 1158 configured as a half-venturi and a blade support external surface 1156 configured to have a greater diameter at the rear of the turbine than at the front of the turbine.

Of course, the improvements described herein may be used in any device through which fluid flows. For example, a person skilled in the art readily recognizes that other turbine designs may be modified in accordance with the present invention and that the resulting modifications will result in a greater efficiency for the turbine. It is also contemplated that this improved turbine may be used in connection with any fluid, such as air or water. For example, the turbine may use wind or tidal forces to turn the turbine.

Both of these embodiments described herein create a higher torque by creating a pressure gradient between the blade and the blade support mechanism.

All of the embodiments described herein may be made of conventional materials using conventional manufacturing techniques. Preferably, the inventive turbine is made of metal, such as aluminum, steel, or brass; fiberglass; or carbon fiber.

Conclusion

The presence of a large helical exhaust vortex, pumped by the central jet and entrained by the external fluid, makes the present invention of great promise in a variety of applications. This vortex, which is insignificant in a conventional turbine, has such a large effect in the inventive turbine because the majority of the rotor flow exits at the tip of the rotor, where its entire radial pressure gradient works to reduce rotor exhaust pressure. The resulting large pressure drop across the rotor enables the present invention to operate at unprecedented levels of specific power output.

The turbine according to the present invention turns at a very low fluid flow speed, is exceptionally quiet, and is rugged even at high speeds. The present invention provides an energy source that requires virtually no preexisting infrastructure and no fuel supply, and can move (by lift pumps) and purify (by driving high-pressure reciprocating pumps for reverse osmosis) water in areas of the world where that would be otherwise impossible. The present invention may be used in regions with lower-level, medium, and even very high winds (or other fluid flow) than other systems, and can provide more power, such as electrical power from a given size and weight of machine than prior turbines. The mechanical simplicity of the present invention means a lower initial cost, a very low level of maintenance, and a long, reliable life. Moreover, no natural resources are consumed and the turbine creates no pollution.

The above described embodiments of the invention are intended to be illustrative only. Numerous alternative embodiments may be devised by those skilled in the art without departing from the spirit and scope of the following claims.

I claim:

1. A turbine having a blade support mechanism defining a duct through which fluid may pass substantially unimpeded and at least one blade supported by the blade support mechanism, wherein the duct has a non-cylindrical geometry configured to accelerate fluid passing through it.

2. The turbine of claim 1, wherein the non-cylindrical geometry is a half-venturi, the half-venturi having a narrower opening at a front of the duct and a wider opening at a rear of the duct.

3. The turbine of claim 1, wherein the non-cylindrical geometry is a truncated cone.

4. The turbine of claim 3, wherein the truncated cone has a narrower opening at a front of the duct and a wider opening at a rear of the duct.

5. The turbine of claim 3, wherein the truncated cone has a wider opening at a front of the duct and a narrower opening at the rear of the duct.

6. The turbine of claim 1, wherein the blade support mechanism has an external surface which has a greater diameter at one of a rear of the turbine and a front of the turbine than at an other of the front of the turbine and the rear of the turbine.

7. The turbine of claim 6, wherein the blade support mechanism is configured so that the diameter changes linearly.

8. The turbine of claim 6, wherein the at least two blades define a constant diameter of the turbine.

9. The turbine of claim 1, wherein the blades have a constant chord.

10. The turbine of claim 1, further comprising a plurality of rows of the blades, each blade having a tip, and the tips of blades in a row being connected by a tip foil.

11. A turbine having a blade support mechanism defining a duct through which fluid may pass substantially unimpeded and at least one blade supported by the blade support mechanism, wherein the blade support mechanism has an external surface which is configured to decelerate fluid and direct the fluid towards a tip of the at least one blade.

12. The turbine of claim 11, wherein the external surface has a greater diameter at the rear of the turbine than at the front of the turbine.

13. The turbine of claim 12, wherein the blade support mechanism is configured so that the diameter changes linearly.

14. The turbine of claim 11, wherein the at least one blade define a constant diameter of the turbine.

15. The turbine of claim 11, wherein the blades have a constant chord.

16. The turbine of claim 11, further comprising a plurality of rows of the blades, each blade having a tip, and the tips of blades in a row being connected by a tip foil.

17. The turbine of claim 11, wherein the duct has a non-cylindrical geometry configured to accelerate fluid passing through it.

18. The turbine of claim 17, wherein the non-cylindrical geometry is a half-venturi, the half-venturi having a narrower opening at a front of the duct and a wider opening at a rear of the duct.

19. The turbine of claim 17, wherein the non-cylindrical geometry is a truncated cone.

20. The turbine of claim 19, wherein the truncated cone has a narrower opening at a front of the duct and a wider opening at a rear of the duct.

21. The turbine of claim 19, wherein the truncated cone has a wider opening at a front of the duct and a narrower opening at a rear of the duct.

22. A turbine comprising:

(a) at least one blade; and (b) a blade support mechanism supporting the at least one blade and defining a duct through which fluid may pass substantially unimpeded and configured to accelerate fluid passing through it by an amount greater than acceleration experienced by said fluid flowing through a cylindrical duct; and having an external surface which is configured to decelerate fluid and direct the fluid toward a tip of the at least one blade.

23. The turbine of claim 22, wherein the external surface is configured to have a greater diameter at a rear of the turbine than at a front of the turbine.

24. The turbine of claim 22, therein the blade support mechanism is configured so that the diameter changes linearly.

25. The turbine of claim 22, wherein the at least one blade defines a constant diameter of the turbine.

26. The turbine of claim 22, wherein the duct has a non-cylindrical geometry.

27. The turbine of claim 26, wherein the non-cylindrical geometry is a half-venturi, the half-venturi having a narrower opening at a front of the duct and a wider opening at a rear of the duct.

28. The turbine of claim 26, wherein the non-cylindrical geometry is a truncated cone.

29. The turbine of claim 28, wherein the truncated cone has a narrower opening at a front of a duct and a wider opening at a rear of the duct.

30. The turbine of claim 28, wherein the truncated cone has a wider opening at a front of the duct and a narrower opening at a rear of the duct.

31. A ducted turbine, comprising:

(a) at least one blade;

(b) a blade support mechanism configured to support the at least one blade;

(c) a duct defined in the blade support mechanism through which fluid may flow; and (d) a fluid redirection device connected to the blade support mechanism and configured to redirect fluid passing through the duct substantially orthogonally to a direction of fluid flow.

32. The ducted turbine of claim 31, wherein the fluid redirection device is connected to a rear of the turbine.

33. The ducted turbine of claim 32, wherein the fluid redirection device has an inside diameter approximately equal to an inside diameter of the duct at the rear of the turbine.

34. The ducted turbine of claim 31, wherein the fluid redirection device is a squirrel cage blower.

35. The ducted turbine of claim 31, wherein the fluid redirection device is configured to rotate synchronously with the blade support mechanism.

36. The ducted turbine of claim 31, wherein the fluid redirection device is configured to rotate faster than the blade support mechanism.

37. The ducted turbine of claim 31, wherein the fluid redirection device is configured to rotate slower than the blade support mechanism.

38. The ducted turbine of claim 31, wherein the duct is configured to accelerate fluid passing through it by an amount greater than acceleration experienced by said fluid flowing through a cylindrical duct.

39. The turbine of claim 38, wherein the duct is configured as a half-venturi, the half-venturi having a narrower opening at a front of the duct and a wider opening at a rear of the duct.

40. The turbine of claim 38, wherein the duct is configured as a truncated cone.

41. The turbine of claim 40, wherein the truncated cone has a narrower opening at a front of the duct and a wider opening at a rear of the duct.

42. The turbine of claim 40, wherein the truncated cone has a wider opening at a front of the duct and a narrower opening at a rear of the duct.

43. The turbine of claim 31, wherein the blade support mechanism has an external surface which is configured to decelerate fluid towards a tip of the at least one blade.

44. The turbine of claim 43, wherein the external surface has a greater diameter at a rear of the turbine than at a front of the turbine.

45. The turbine of claim 44, wherein the blade support mechanism is configured so that the diameter changes linearly.

46. The turbine of claim 44, wherein the at least one blade define a constant diameter of the turbine.

47. The turbine of claim 31, wherein the duct is configured to accelerate fluid passing through it by an amount greater than acceleration experienced by said fluid flowing through a cylindrical duct; and the blade support mechanism has an external surface which is configured to decelerate fluid and direct the fluid towards a tip of the at least one blade.

48. A turbine having a blade support mechanism defining a duct and at least one blade supported by the blade support mechanism, wherein the duct is configured as a half-venturi.

49. The turbine of claim 48, wherein the half-venturi has a narrower opening at a front of the duct and a wider opening at a rear of the duct.

50. A turbine having a blade support mechanism defining a duct and at least one blade supported by the blade support mechanism, wherein the blade support mechanism has an external surface which is configured to decelerate fluid and direct the fluid towards a tip of the at least one blade and wherein the duct is configured as a half-verturi.

51. The turbine of claim 50, wherein the half-venturi has a narrower opening at a front of the duct and a narrower opening at a rear of the duct.

* * * * *

UNITED STATES PATENT AND TRADEMARK OFFICE
CERTIFICATE OF CORRECTION

PATENT NO.    : 6,053,700
DATED         : April 25, 2000
INVENTOR(S)   : George A. Fosdick It is certified that error appears in the above-identified patent and that said Letters Patent is hereby corrected as shown below:

Column 3,
Line 45, after "surface", reamove "decelerates the fluid flow and";

Column 5,
Line 26, after "configure to", remove "decelerate fluid passing through the blades and";
Line 27, after "the flow", insert -- of fluid --;

Column 6,
Lines 42, and 43, after "configuration", remove "decelerates the fluid flow and;
Line 43, after "the flow", insert -- of fluid --;

Claim 11,
Line 5, after "configured to", remove "decelerate fluid and";

Claim 22,
Line 9, after "configured to", remove "decelerate fluid and";

Claim 43,
Line 3, :decelerate" should read -- direct --;

UNITED STATES PATENT AND TRADEMARK OFFICE
CERTIFICATE OF CORRECTION

PATENT NO.    : 6,053,700
DATED         : April 25, 2000
INVENTOR(S)   : George A. Fosdick It is certified that error appears in the above-identified patent and that said Letters Patent is hereby corrected as shown below:

Claim 47,
Line 5, after "configured to ", remove "decelerate fluid and";

Signed and Sealed this

Twenty-first Day of August, 2001

*Attest:*

*Attesting Officer*

NICHOLAS P. GODICI
*Acting Director of the United States Patent and Trademark Office*